United States Patent
Liu et al.

(10) Patent No.: US 10,162,974 B2
(45) Date of Patent: Dec. 25, 2018

(54) CONCEALING SENSITIVE INFORMATION ON A DISPLAY

(71) Applicants: Guoxin Liu, Beijing (CN); Yunxia Cheng, Beijing (CN); Yuping Wei, Beijing (CN); Jian Mu, Beijing (CN); Yueting Zhang, Beijing (CN); Wenlong Shao, Beijing (CN)

(72) Inventors: Guoxin Liu, Beijing (CN); Yunxia Cheng, Beijing (CN); Yuping Wei, Beijing (CN); Jian Mu, Beijing (CN); Yueting Zhang, Beijing (CN); Wenlong Shao, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/210,149

(22) Filed: Jul. 14, 2016

(65) Prior Publication Data

US 2016/0321457 A1 Nov. 3, 2016

(51) Int. Cl.

| G06F 21/84 | (2013.01) |
|---|---|
| G06F 21/60 | (2013.01) |
| G06T 11/60 | (2006.01) |
| G06F 3/14 | (2006.01) |
| G09G 5/14 | (2006.01) |
| G06F 21/31 | (2013.01) |

(52) U.S. Cl.
CPC .......... *G06F 21/604* (2013.01); *G06F 3/1454* (2013.01); *G06F 21/31* (2013.01); *G06F 21/84* (2013.01); *G06T 11/60* (2013.01); *G09G 5/14* (2013.01); *G09G 2354/00* (2013.01); *G09G 2358/00* (2013.01)

(58) Field of Classification Search
None
See application file for complete search history.

(56) References Cited

U.S. PATENT DOCUMENTS

| 6,345,358 B1* | 2/2002 | Hall, Jr. ................ G06F 3/0481 713/1 |
|---|---|---|
| 2004/0218036 A1* | 11/2004 | Boss ...................... G06F 21/62 348/14.08 |
| 2005/0138650 A1* | 6/2005 | Hon ........................ A47G 9/02 719/330 |
| 2006/0172700 A1* | 8/2006 | Wu ......................... G06F 21/35 455/41.2 |
| 2007/0203646 A1* | 8/2007 | Diaz .................. G01C 21/3688 701/469 |
| 2009/0132419 A1* | 5/2009 | Grammer ............ G06F 21/6245 705/50 |
| 2011/0047478 A1* | 2/2011 | Ellsworth ............... G06F 9/543 715/747 |

(Continued)

Primary Examiner — David H Chu
(74) Attorney, Agent, or Firm — Thomas | Horstemeyer, LLP

(57) ABSTRACT

An example method is provided for a computing device, coupled to a first display and a second display, to conceal sensitive information on a display. The method may comprise in response to detecting sensitive information in a desktop shown on the first display, generating a replacement image that conceals the detected sensitive information in the desktop and sending the replacement image to the second display for display. Otherwise, a mirror image of the desktop shown on the first display may be sent to the second display for display.

20 Claims, 7 Drawing Sheets

(56) References Cited

U.S. PATENT DOCUMENTS

| | | | |
|---|---|---|---|
| 2012/0233671 A1* | 9/2012 | Beder | G06F 21/6227 726/4 |
| 2012/0259877 A1* | 10/2012 | Raghunathan | G06F 21/6254 707/757 |
| 2013/0328878 A1* | 12/2013 | Stahl | G06F 3/1431 345/428 |
| 2014/0078402 A1* | 3/2014 | Weast | H04N 21/4438 348/730 |
| 2014/0109243 A1* | 4/2014 | Ting | G06F 21/60 726/30 |
| 2014/0201805 A1* | 7/2014 | Riordan | G06F 21/60 726/1 |

* cited by examiner

CONCEALING SENSITIVE INFORMATION ON A DISPLAY

CROSS-REFERENCE TO RELATED APPLICATION

This application is a continuation of and claims the benefit of U.S. patent application Ser. No. 14/257,015, entitled "Concealing Sensitive Information on Display," and filed Apr. 21, 2014, which is hereby incorporated by reference in its entirety.

BACKGROUND

Unless otherwise indicated herein, the approaches described in this section are not admitted to be prior art by inclusion in this section.

A computing device may be connected to multiple displays. Having a second display in addition to a first display is useful for different applications. For example, during a presentation, the first display of the computing device may be oriented towards a user (e.g., presenter) and the second display towards an audience. The second display generally mirrors the first display to display the same content, in which case any sensitive information on the first display will also be on the second display and visible to the audience.

DETAILED DESCRIPTION

Figure 1:
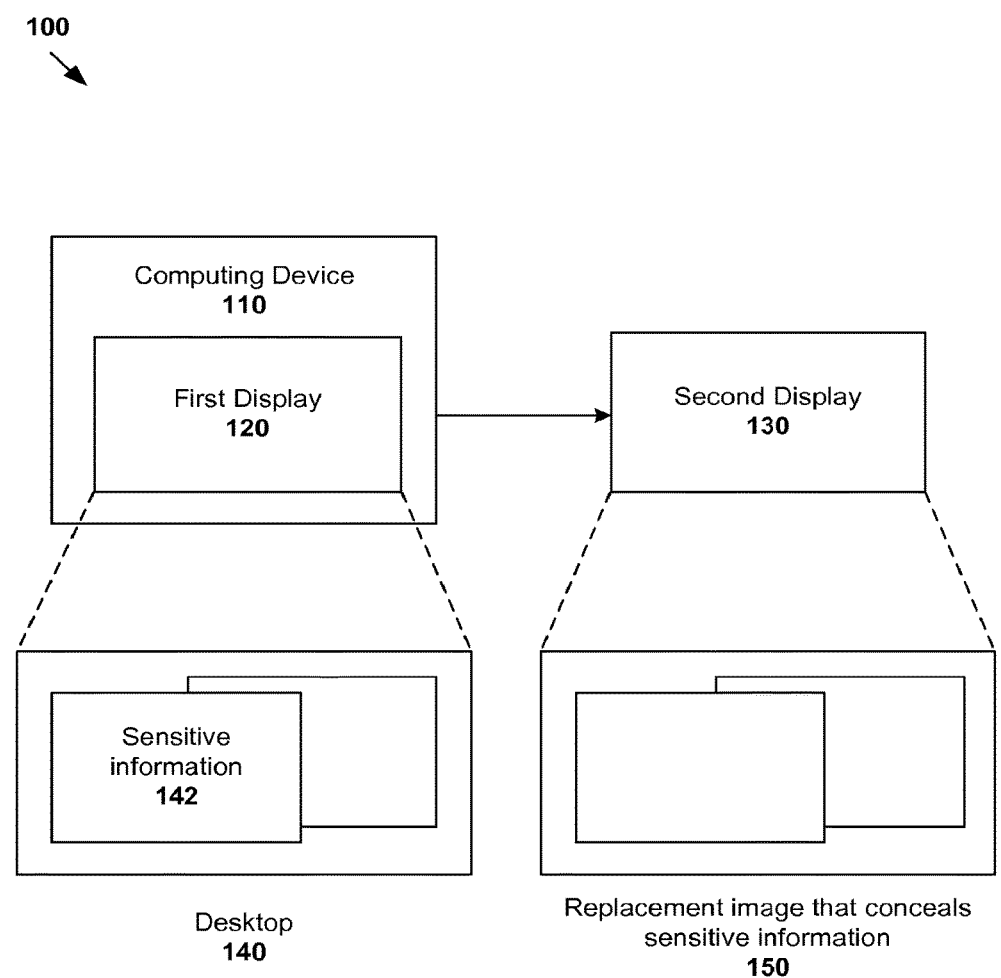
FIG. 1 is a schematic diagram illustrating an example computing environment in which sensitive information on a first display is concealed on a second display.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

According to examples in the present disclosure, sensitive information is displayed on a first display (e.g., internal display) of a computing device, but not on a second display (e.g., external display). When there is no sensitive information in a desktop, the computing device mirrors or duplicates the desktop on the first and second displays. By detecting and concealing the sensitive information, it is protected from undesirable observation by, for example, an audience to which the second display is visible. As such, in these circumstances, it is not necessary for a user to manually disconnect the second display from the computing device, or switch off the second display. This improves user experience, privacy protection and security, as well as reduces, if not eliminates, the risk of inadvertently disclosing sensitive information via the second display.

FIG. 1 is a schematic diagram illustrating example computing environment 100 that includes computing device 110 that is coupled to first display 120 and second display 130. Computing device 110 detects sensitive information 142 in desktop 140 shown on first display 120. In response to detecting sensitive information 142, computing device 110 generates replacement image 150 that conceals sensitive information 142. Replacement image 150 is then sent to second display 130 for display. Otherwise, a mirror image of desktop 140 is sent to second display 130 for display.

"Sensitive information" 142 may include any information that is deemed confidential, private, or the like, for any reason. Examples of sensitive information 142 include password; login username; personal information (e.g., address, phone number, social security number, date of birth, personal identification number, personal health records, etc.); credit card information; bank account information; files and messages (e.g., emails, instant messages, notifications, etc.); information associated with a computing application (e.g. information on Internet browser, word processing application, spreadsheet application, email application, calendar application, task manager, database application, etc.), etc. The list of sensitive information 142 may be configured by a user of computing device 110.

Detection of sensitive information 142 may be performed using any suitable approach, such as by detecting a user interface element associated with sensitive information 142. "User interface element" may include any element on first user interface 140, such as text entry field, window, selectable button, menu item, toolbar item, pop-up message or notification, etc. The term "window" refers to a generally rectangular, enclosed area of a display that may occupy the entire or part of the display. There are different types of windows. For example, a document window generally contains user data, while an app window may be the main window of a computing application.

For example, sensitive information 142 may be detected when a user of computing device 110 is entering a password into a text entry field on desktop 140, or opening a window of a computing application that is deemed sensitive (e.g., email application of a work or personal email address). In these examples, the user interface element associated with sensitive information 142 should be concealed on second display 130.

The term "desktop" refers to a user interface environment through which users can launch, interact with, and manage the user's data, settings, applications, settings, and/or data, etc. Desktop 140 may be shown on a display and include a user interface having at least one user interface elements. For example, a user may interact with a user interface element shown on desktop 140 using any suitable user input device, such as a mouse, touchpad, keyboard, touchscreen, stylus, joystick, etc. In general, desktop 140 is always shown on first display 120 and a mirror image of desktop 140 is shown on second display 130. However, according to examples of the present disclosure, when there is no sensitive information in desktop 140, replacement image 150 is shown on second display 130.

It will be appreciated that the term "desktop" is also known to be used to refer to a physical computer system or "physical desktop" that might be placed on or near a user's desk, as distinct from a mobile computer system such as a "laptop", "tablet" etc. However, as used herein, the term "desktop" refers to the user interface environment described above, and not a particular physical computer system.

Figure 2:
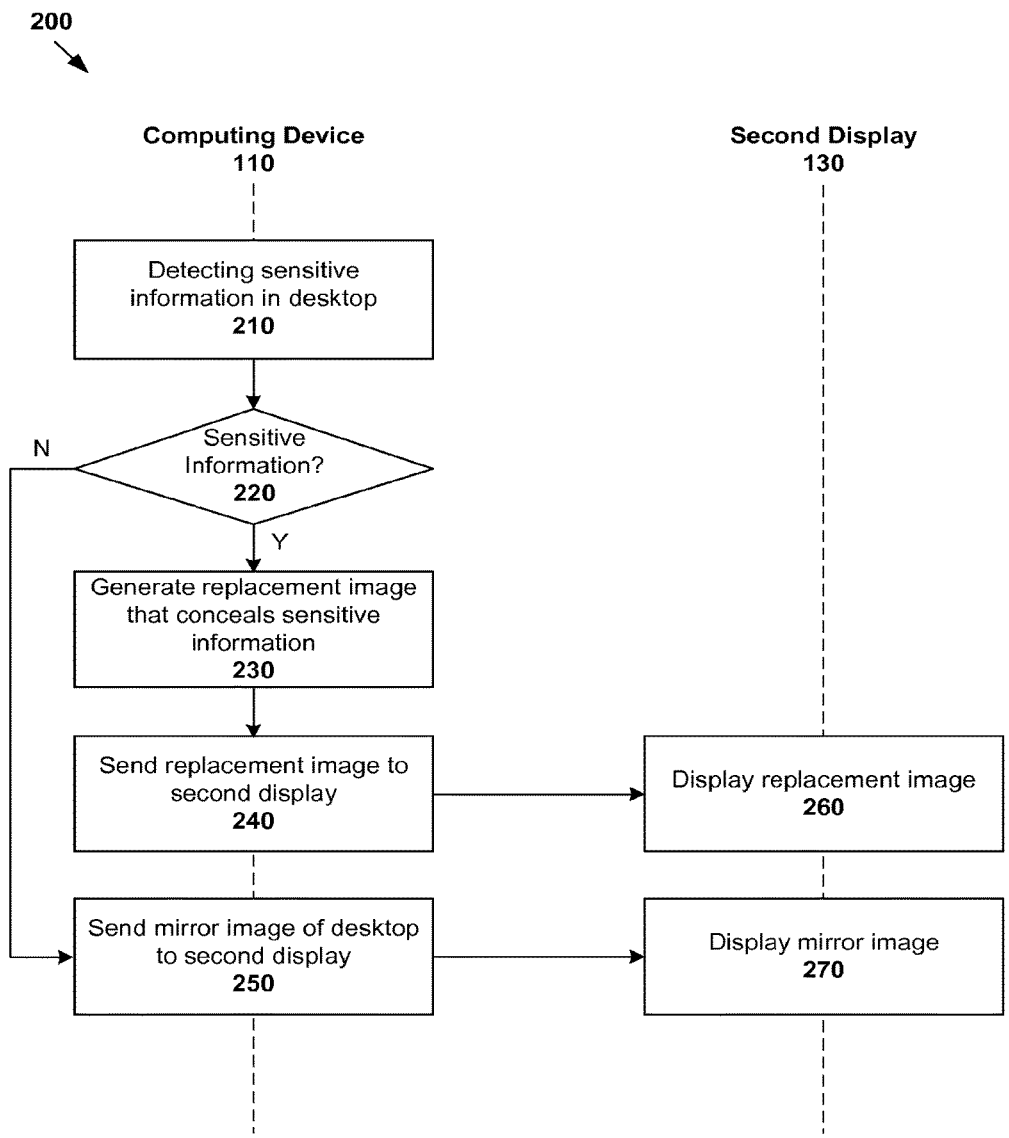
FIG. 2 is a flowchart of an example process for concealing sensitive information on a second display.

In more detail, FIG. 2 is a flowchart of an example process 200 for computing device 110 to conceal sensitive information 142 on second display 130. Process 200 may include one or more operations, functions, or actions illustrated by one or more blocks, such as blocks 210 to 270. The various blocks may be combined into fewer blocks, divided into additional blocks, and/or eliminated based upon the desired implementation.

Referring to computing device 110 in FIG. 2: at block 210, computing device 110 detects sensitive information 142 in desktop 140 shown on first display 120. At blocks 220 to 240, in response to detecting sensitive information 142, computing device 110 generates replacement image 150 that conceals sensitive information 142 and sends it to second display 130 for display. Effectively, this disables the mirroring between first display 120 and second display 130 to allow them to display different content. Otherwise (concealment of sensitive information 142 is not required), at block 250, computing device 110 sends a mirror image of desktop 140 to second display 130 for display.

Referring to second display 130 in FIG. 2: second display 130 either receives and displays replacement image 150 when sensitive information 142 is detected (see block 260); otherwise, second display 130 receives and displays a mirror image of desktop 140 (see block 270).

Replacement image 150 may be generated at block 230 using any suitable approach. For example, computing device 110 may capture a snapshot or static image of desktop 140 before sensitive information 142 is visible. Instead of using a static image, a video or screensaver may also be used as replacement image 150 while concealment of sensitive information 142 is required. Another example is to simply send a blank image to the second display, thus showing a blank screen.

In another example, computing device 110 may modify a portion of desktop 140 where sensitive information 142 is detected (e.g., portion that includes text entry field, window, etc.). The "modification" may be performed by computing device 110 using any suitable image processing techniques, include blurring, pixelating, blanking, blocking and overlaying the portion with an image or message, etc. Other portions of desktop 140 that do not include any sensitive information 142 may be included in replacement image 150 and are therefore visible on second display 130.

Second display 130 may be an external display connected to computing device, such as a computer monitor, projector, television, high-definition television (HDTV) display and mobile display device (e.g., a tablet device). First display 120 may be a built-in, internal display of the computing device 110, or an external display connected to computing device 110 via wired or wireless connection. Although first 120 and second 120 displays are illustrated in FIG. 1, computing device 110 may include more than two displays. In this case, at least one of the displays is capable of acting as first display 120 and at least one as second display 130.

Computing device 110 may be a mobile computing device, such as laptop or notebook computer, tablet computer, smart phone, e-reader, touchscreen-based computer and personal digital assistant (PDA), etc. Of course, computing device 110 may also be a personal computer intended for regular use at a single location/desk (as opposed to a mobile computing device), etc. Any suitable operating system may be used on computing device, such as iOS, Android, Blackberry 10, Windows, and Linux, etc.

Connection between computing device 110 and second display 130 may be implemented using any suitable technology, such as wireless connection (e.g., Bluetooth, Wi-Fi, infrared etc.) or wired connection linking an port of computing device 110 with an input port of second display 130 (e.g., HDMI (High-Definition Multimedia Interface), USB (Universal Serial Bus), FireWire (IEEE 1394 interface), etc.

Examples of how example process 200 may be implemented to conceal sensitive information 142 in different applications will now be explained with reference to FIG. 3 to FIG. 5.

Concealing Entry of Sensitive Information

Figure 3:
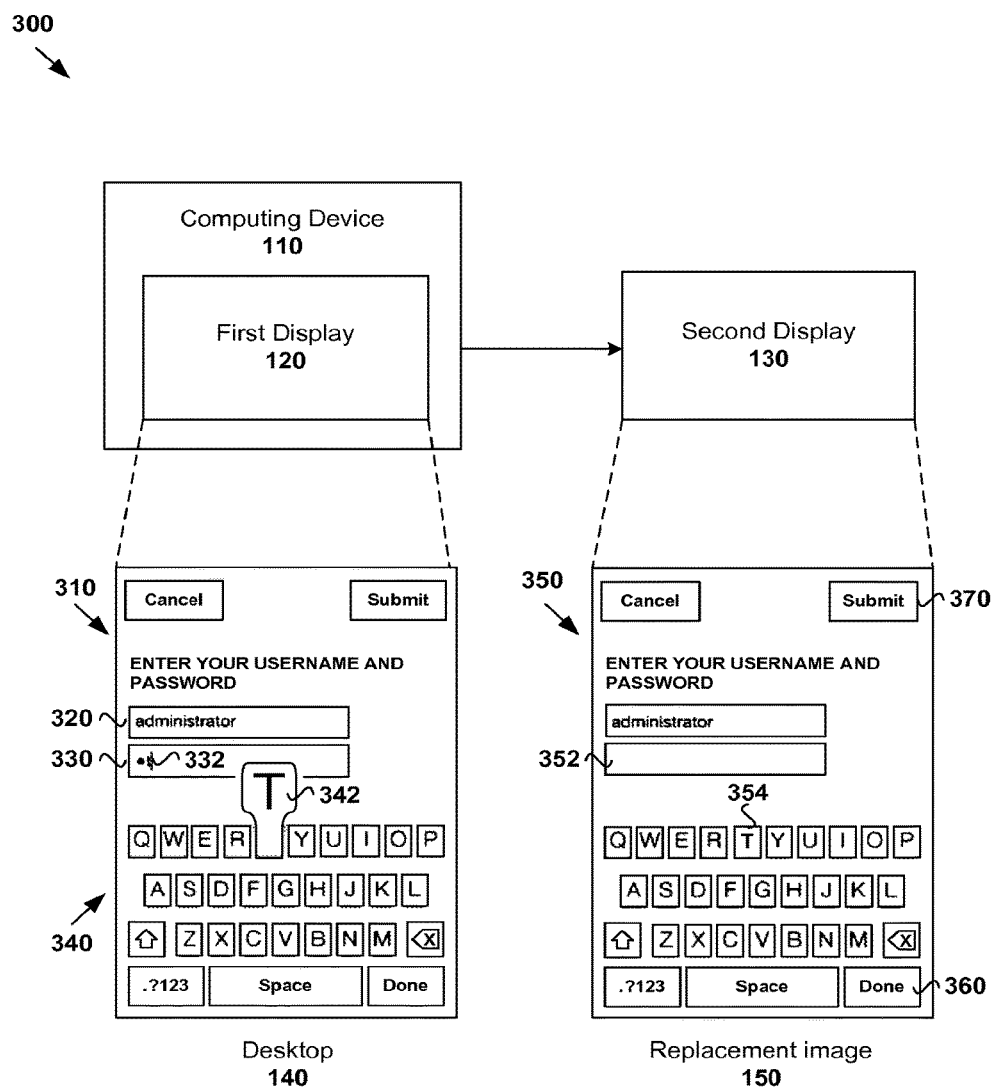
FIG. 3 is a schematic diagram illustrating an example computing environment in which entry of sensitive information is concealed on a second display.

FIG. 3 is a schematic diagram illustrating example computing environment 300 in which entry of sensitive information 142 is concealed on second display 130. In this example, desktop 140 on first display 120 includes login interface 310 with username field 320 (e.g., "administrator") and password field 330. Login interface 310 may be used to connect to a remote server, unlock computing device 110 and/or start up a computing application (e.g., email application), etc.

Although characters entered into password field 330 are replaced by a dot ("•") or asterisk ("*") in password field 330, the last character entered (i.e., "t" at 332) is usually visible before it is obscured. Further, the computing device 110 may be a touchscreen-based computer. Since virtual keyboard 340 also appears on desktop 140, the selection of characters as the password is entered is also visible (see enlarged key "T" at 342). As such, if login interface 310 is displayed on second display 130, there is a risk of security threat due to inadvertent disclosure of the username and password. To reduce this risk, computing device 110 generates replacement image 150 for display on second display 130 to conceal the password entry into password field 330.

Figure 4:
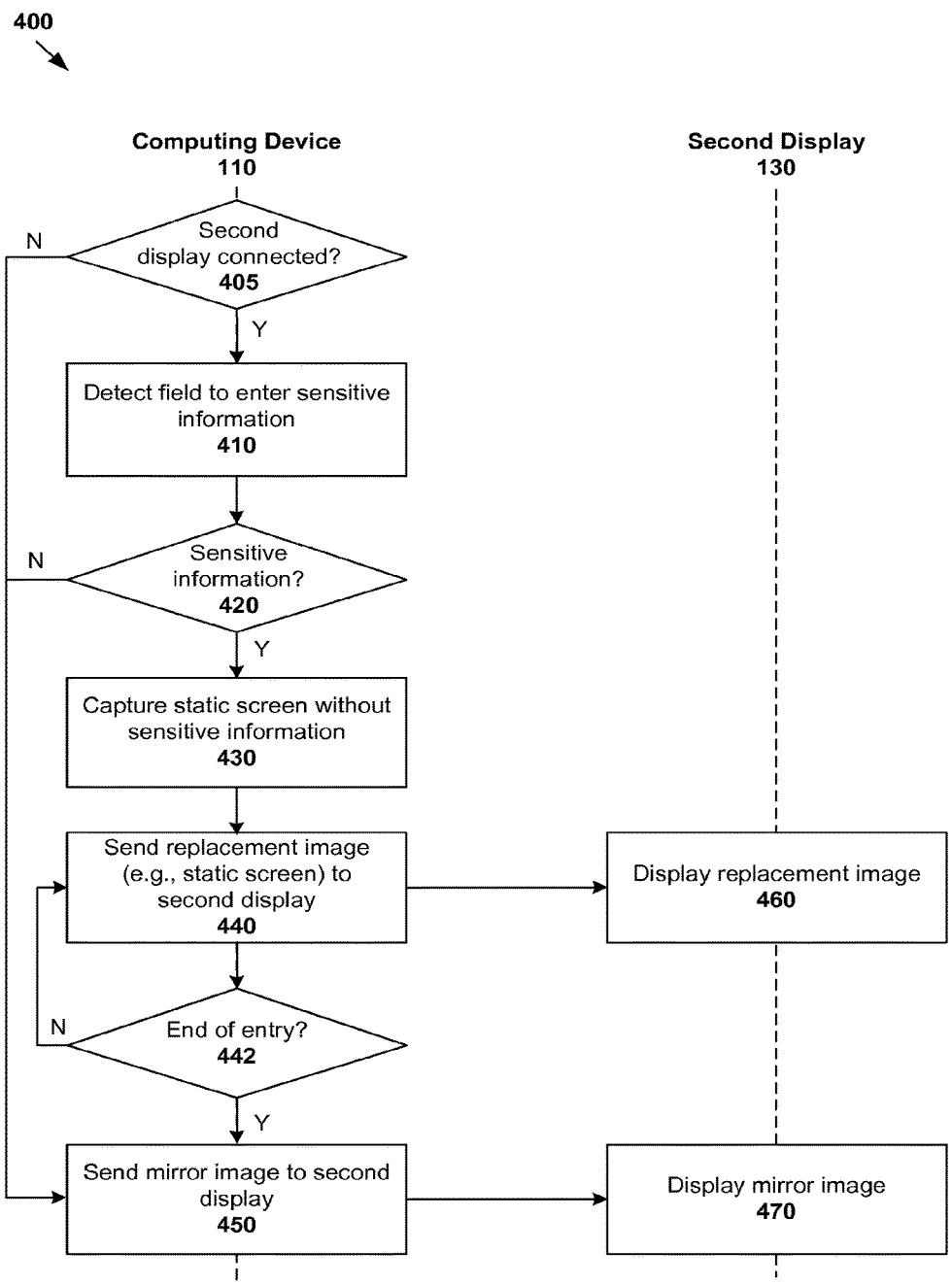
FIG. 4 is a flowchart of an example process for concealing entry of sensitive information on the second display in FIG. 3.

FIG. 4 is a flowchart illustrating example process 400 for concealing entry of sensitive information (e.g., entry via password field 330) on second display 130. Process 400 may include one or more operations, functions, or actions illustrated by one or more blocks, such as blocks 405 to 480. The various blocks may be combined into fewer blocks, divided into additional blocks, and/or eliminated based upon the desired implementation.

At block 405 in FIG. 4, computing device 110 determines whether second display 130 is connected and concealment of sensitive information is required. At blocks 410 and 420 in FIG. 4 (related to 210 and 220 in FIG. 2), if second display 130 is connected, computing device 110 detects user interface element (e.g., password field 330) on desktop 140.

Without limitation, several examples are provided below. For example, password field 330 may be detected based on a property indicative of its association with sensitive information, such as that it can contain, or receive entry of, sensitive information, etc. Sensitive information may be detected when password field 330 is in focus (i.e., capable of receiving input). In practice, blocks 410 and 420 may be implemented based on the relevant operating system of computing device 110 and/or how desktop 140 is generated.

For iOS applications, to determine whether second display 130 is connected according to block 405, the value of property "[UIScreen screens] count" may be checked, which will be more than one there are multiple displays. Alternatively or additionally, notifications may be used to detect attachment and detachment of a display to computing device 110, such as "UIScreenDidConnectNotification" and "UIScreenDidDisconnectNotification". To identify password field 330 according to blocks 410 and 420, the "secureTextEntry" property is generally enabled (i.e., value="YES") for text fields to receive password or other sensitive information.

For Android applications, to determine whether second display 130 is connected according to block 405, class "DisplayManager" having path "android.hardware.display.DisplayManager" includes a public method "Display[ ] getDisplays(String category)" that obtains all currently valid logical displays of the specified category. To obtain displays of a particular category (e.g., presentation display), calling the following should return an array of one or more items: "getDisplays(DISPLAY_CATEGORY_PRESENTATION)". To identify password field 330 according to blocks 410 and 420, boolean result="editText.getInputType( )&InputType.TYPE_TEXT_VARIATION_PASSWORD" may be used. This obtains the value of property "InputType" of a text input control and determining whether the mask of the value includes "InputType.TYPE_TEXT_VARIATION_PASSWORD" (0x80).

For Windows applications, to determine whether second display 130 is connected according to block 405, display information may be retrieved using "EnumDisplayMonitors (NULL, NULL, MyInfoEnumProc, 0)." If both first display 120 and second display 130 are connected, the result includes information of both displays (e.g., "DeviceName", "State Flags" to indicate whether the display is desktop or desktop primary, "DeviceID" and "MonitorName", etc.). To identify password field 330 according to blocks 410 and 420, any suitable message such as an "EM_GETPASSWORDCHAR" message may be used. Alternatively or additionally, if login interface 310 is implemented using HTML (HyperText Markup Language) version 5 in the above examples, input type "password" on a form may be identified to detect password field 330.

At block 430 in FIG. 4 (related to 230 in FIG. 2), in response to detecting sensitive information in desktop 140, computing device 110 generates replacement image 150. In the example in FIG. 3, replacement image 150 is static image 350 that is captured before password is entered via field 330. For example, static image 350 may be captured by computing device 110 after password field 330 is in focus (e.g., mouse focuses on field 330 and password field 330 is capable of receiving input) but before any character is entered (see 352 in FIG. 3). In this case, entry of characters via keyboard 340 will not be visible on replacement image 150 (see 354 in FIG. 3).

At blocks 440 and 460 in FIG. 4 (related 240 and 260 in FIG. 2), replacement image 150 is sent to second display 130 for display. Otherwise at blocks 450 and 470 (related to 250 and 270 in FIG. 2), concealment of sensitive information is not required, because second display 130 is not connected or sensitive information is not detected. In this case, a mirror image of desktop 140 is sent and displayed on second display 130 instead.

Static image 350 is displayed on second display 130 while password is being entered via password field 330. At block 442 in FIG. 4, computing device 110 checks whether entry of sensitive information has ended. For example, this may involve detecting whether password field 330 is no longer in focus (e.g., mouse not focusing on field 330), or a button (e.g., done 360 or submit 370 button 360) has been pressed, etc.

Once the password entry has ended, a mirror image of desktop 140 is sent to second display 130, which will once again mirror first display 120. Otherwise, second display 130 continues to display replacement image 150 which conceals the entry via password field 330. It will be appreciated that replacement image 150 may only be sent once to second display 130 and it is not necessary to repeat block 440 in FIG. 4 as the password is entered.

Although static image 350 is used in the examples in FIG. 3 and FIG. 4, it will be appreciated that any other suitable approach may be used. For example, portion of login interface 310 that includes password field 330 of may be modified (e.g., blanked, blurred, blocked or overlaid with another image). In addition to concealing password field 330, username field 320 and keyboard 340 on login interface 310 may also be concealed. Any other type of sensitive information not shown in FIG. 3 and FIG. 4 may be concealed in a similar manner.

Further, when determining whether second display is connected at block 405 in FIG. 4, connection of second display 130 to computing device 110 may also be determined using any other suitable approach, such as checking a port (e.g., HDMI, USB, FireWire, etc.) or wireless connection of computing device 110.

Concealing Sensitive Computing Applications

Figure 5:
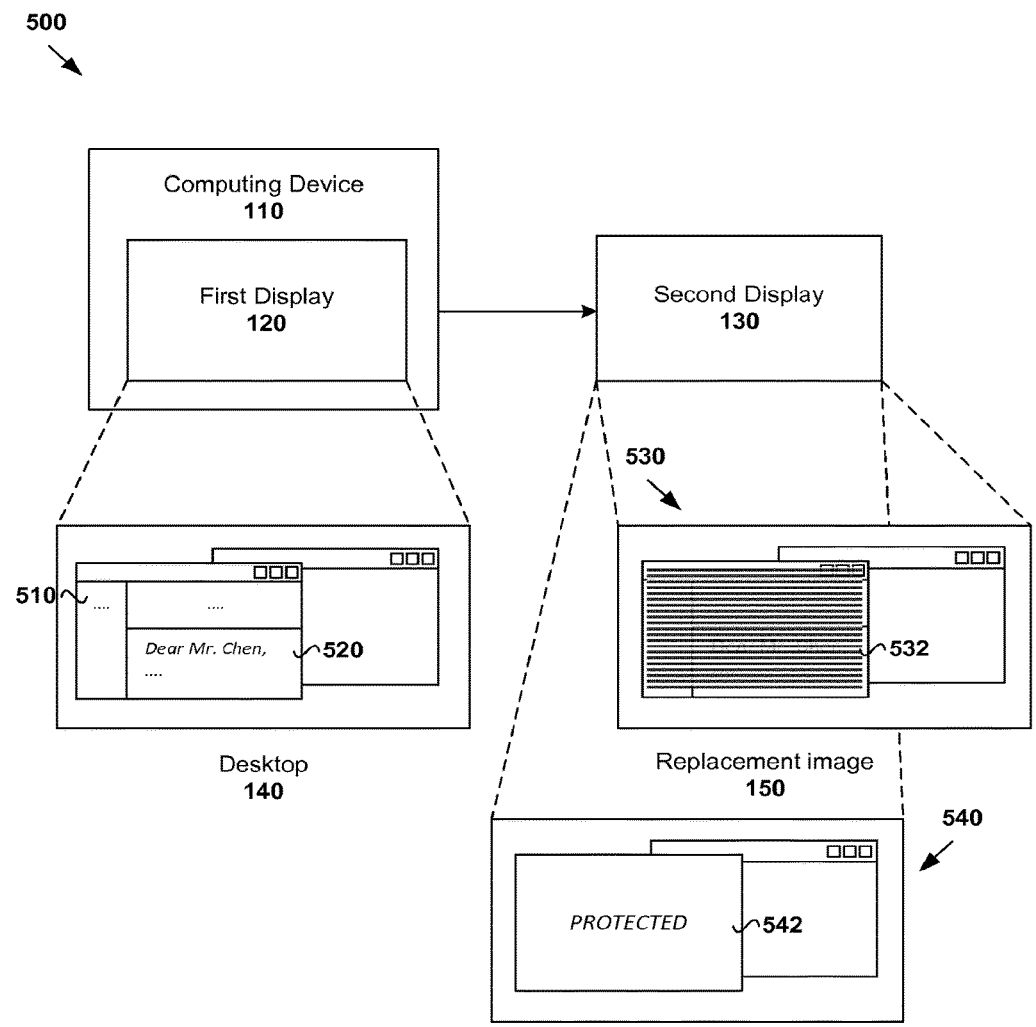
FIG. 5 is a schematic diagram illustrating an example computing environment in which sensitive information associated with a computing application is concealed on a second display.

FIG. 5 is a schematic diagram illustrating example computing environment 500 in which sensitive information associated with a computing application is concealed on a second display 130. In this case, computing device 110 may maintain a list of sensitive computing applications that require protection.

In the example in FIG. 5, email application interface 510 (e.g., window or other user interface element) of a sensitive computing application (e.g., email application) is concealed on second display 130. Email application interface 510 on desktop 140 includes email information 520 that should not be shared on second display 130. Once computing device 110 detects that desktop 140 includes email application interface 510 (similar to block 210 in FIG. 2), replacement image 150 is generated to conceal any sensitive information 520 on email application interface 510.

Email application interface 510 may be detected by computing device 110 by checking the type of application that a user opens. For example, for iOS applications, computing device 110 may check whether a sensitive computing application is launched and has an active state, i.e., "UIApplicationStateActive" is true. For Windows applications, computing device 110 may check the visibility state of a window of a sensitive computing application, i.e., whether the return value of a "IsWindowVisible( )" function may be used to determine is nonzero which means the window is visible.

For Android applications, an example "isForeground( )" function in Table 1 may be used to check whether a sensitive computing application is active and in the foreground. Line 2 in Table 1 is to retrieve an "Activity Manager" for interacting with a global system state, in particular to retrieve a list of application processes that are running on computing device 110 at line 3. The rest of the function checks whether the list of running processes include a sensitive computing application that is running in the foreground (e.g., visible). A similar approach may be used for other operating systems.

TABLE 1

Example implementation to detect a sensitive computing
application for Android applications

```
1    public static boolean isForeground(Context context) {
2        ActivityManager activityManager = (ActivityManager)
             context.getSystemService(Context.ACTIVITY_SERVICE);
3        List<RunningAppProcessInfo> appProcesses =
             activityManager.getRunningAppProcesses( );
4        for (RunningAppProcessInfo appProcess : appProcesses) {
5            if (appProcess.processName.equals(context.getPackageName( ))) {
6                if (appProcess.importance ==
                     RunningAppProcessInfo.IMPORTANCE_FOREGROUND) {
7                    return true;
8                } else {
9                    return false;
10               }
11           }
12       }
13       return false;
14   }
```

Two examples of replacement image 150 are shown on FIG. 5. In one example indicated at 530, email application interface 510 is blurred or blocked 532 in real-time to conceal email information 520. If email application interface 510 changes (e.g., due to movement, minimization, maximization, etc.), the change may still be visible on second display 130 without disclosing email information 520.

In another example indicated at 540, email application interface 510 is overlaid with a static image or message reading "PROTECTED" 542 to provide an indication to viewers of second display 130 as to why email application interface 510 is not visible. In both examples 530 and 540, only one portion of desktop 140 is modified to conceal sensitive information while the rest is still visible on replacement image 150.

Replacement image 150 may be displayed on second display 130 until it is determined that concealment of sensitive information is not required. For example, computing device 110 may determine whether email application interface 510 is closed, minimized or no longer active etc. For iOS applications, computing device 110 may check whether its state changes from active to inactive, i.e., "UIApplicationStateActive" is false. Similarly, the "IsWindowVisible( )" function may be used for Windows applications, and "isForeground( )" in Table 1 for Android applications, etc.

The list of sensitive applications may be configurable by a user of computing device 110, and stored locally (e.g., in a local memory) or remotely (e.g., in a remote server accessible by computing device 110). Although email application interface 510 is used as an example in FIG. 5, the list of sensitive computing applications may include Internet browser, word processing application, spreadsheet application, calendar application, task manager, or database application, etc. Other user interface elements (e.g., pop-up notifications) associated with any of the sensitive applications may also be automatically concealed by computing device 110 such that the information is displayed on first display 120, but not on second display 130.

Virtualized Desktop

Figure 6:
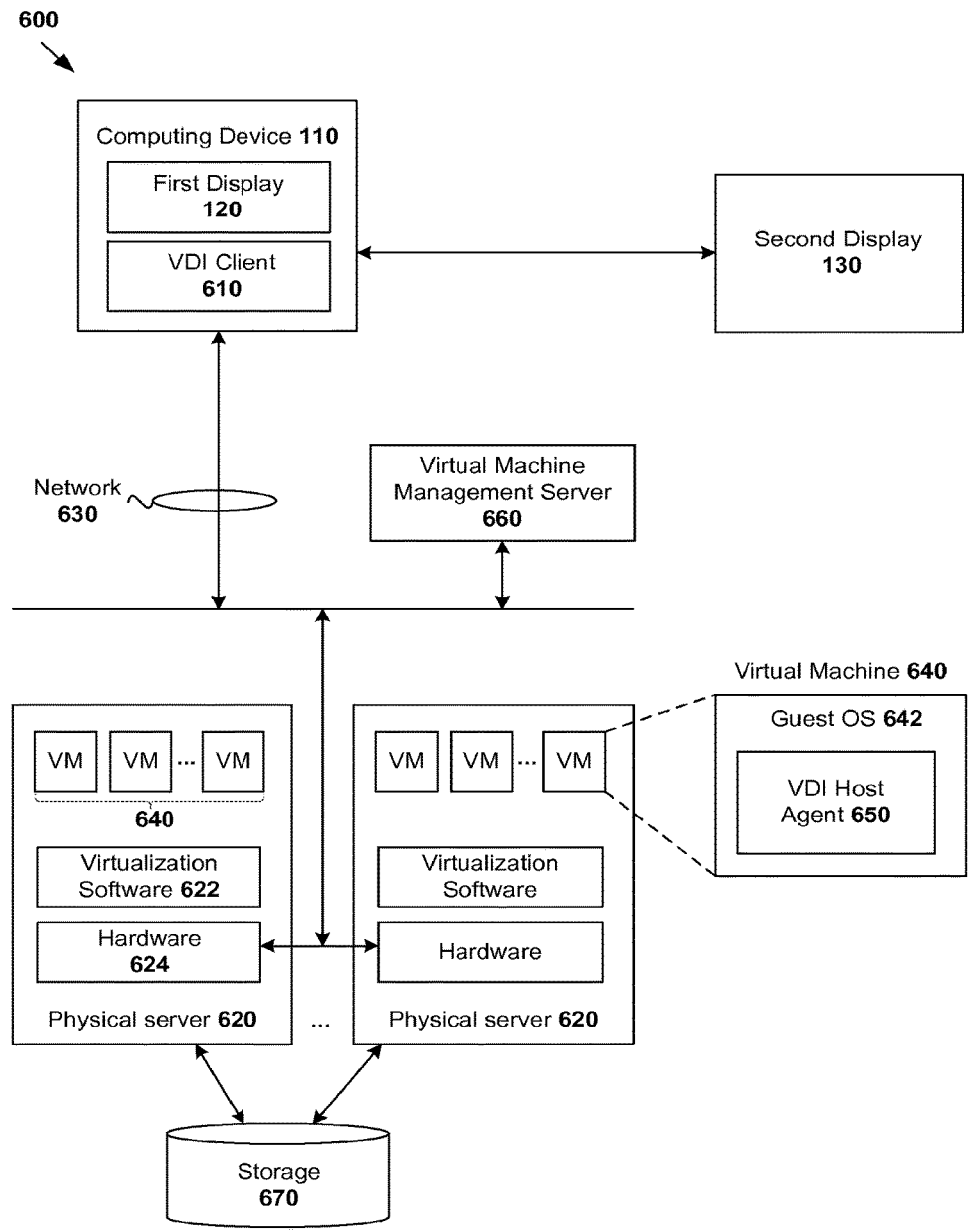
FIG. 6 is a schematic diagram illustrating an example virtualized computing environment that includes a computing device.

Computing device 110 may be a standalone device, or a client device used to access a remote desktop, etc. FIG. 6 is a schematic diagram illustrating example virtualized desktop system 600 in which examples according to FIG. 1 to FIG. 5 may be implemented.

Computing device 110, which acts as a client device, runs VDI (Virtual Desktop Infrastructure) client 610 to allow access to a remote desktop supported by physical server 620 via network 630. Physical servers 620 each execute virtualization software 622 and include suitable hardware 624 that support multiple virtual machines 640. Virtual machine 640 runs a remote desktop accessible by computing device 110. For example, virtual machine 640 may implement guest operating system 642 that supports VDI host agent 650 to provide access to the remote desktop by computing device 110 via VDI client 610. Physical servers 620 may be controlled by virtual machine management server 660 and access a shared persistent storage system 670.

When connecting to virtual machine 640, VDI client 610 displays login interface 310 in FIG. 3 on first display 120. To conceal password entered via password field 330, VDI client 610 may generate replacement image 150 for display on second display 130 according to examples in FIG. 3 and FIG. 4.

Once VDI client 610 is connected to VDI host agent 650 to access the remote desktop, detection of sensitive information may be performed by VDI client 610 based on information from VDI host agent 650. For example, VDI host agent 650 may send a signal to VDI client 610 once sensitive information is detected in desktop 140, such as when user is about to enter password or a CTRL+ALT+DEL input is received by VDI host agent 650. In this case, VDI client 610 may generate replacement image 150 or receives one from VDI host agent 650.

In virtualized computing environment 600, VDI client 610 and VDI host agent 650 may support a functionality called "presentation mode" where VDI client 610 displays two screens (e.g., windows) on first display 120. One screen may show a virtual keyboard and a touch pad, while another screen shows the remote desktop supported by VDI host agent 650. Second display 130 generally displays the remote desktop, but not the input element (e.g., touch pad, function keys). This means that key selection and entry via the virtual keyboard will not be displayed on second display 130.

However, when not in presentation mode, second display 130 also displays the virtual keyboard if it is displayed on first display 120. As such, sensitive information may be leaked by observing the keys highlighted via the virtual keyboard. Further, regardless of whether presentation mode is active, second display 130 generally displays any sensitive computing application that is active on first display 120, therefore increasing the risk of inadvertently disclosing information displayed by the sensitive computing application. In this case, examples according to FIG. 3 to FIG. 5 may be implemented.

Similarly, with or without assistance from VDI host agent 650, VDI client 610 may conceal a user interface element of a sensitive computing application according to examples in FIG. 5. In this case, a list of sensitive applications may be stored on storage 670 accessible by VDI client 610 via VDI host agent 650. Of course, any other sensitive information may be protected in a similar manner.

Computer System

Figure 7:
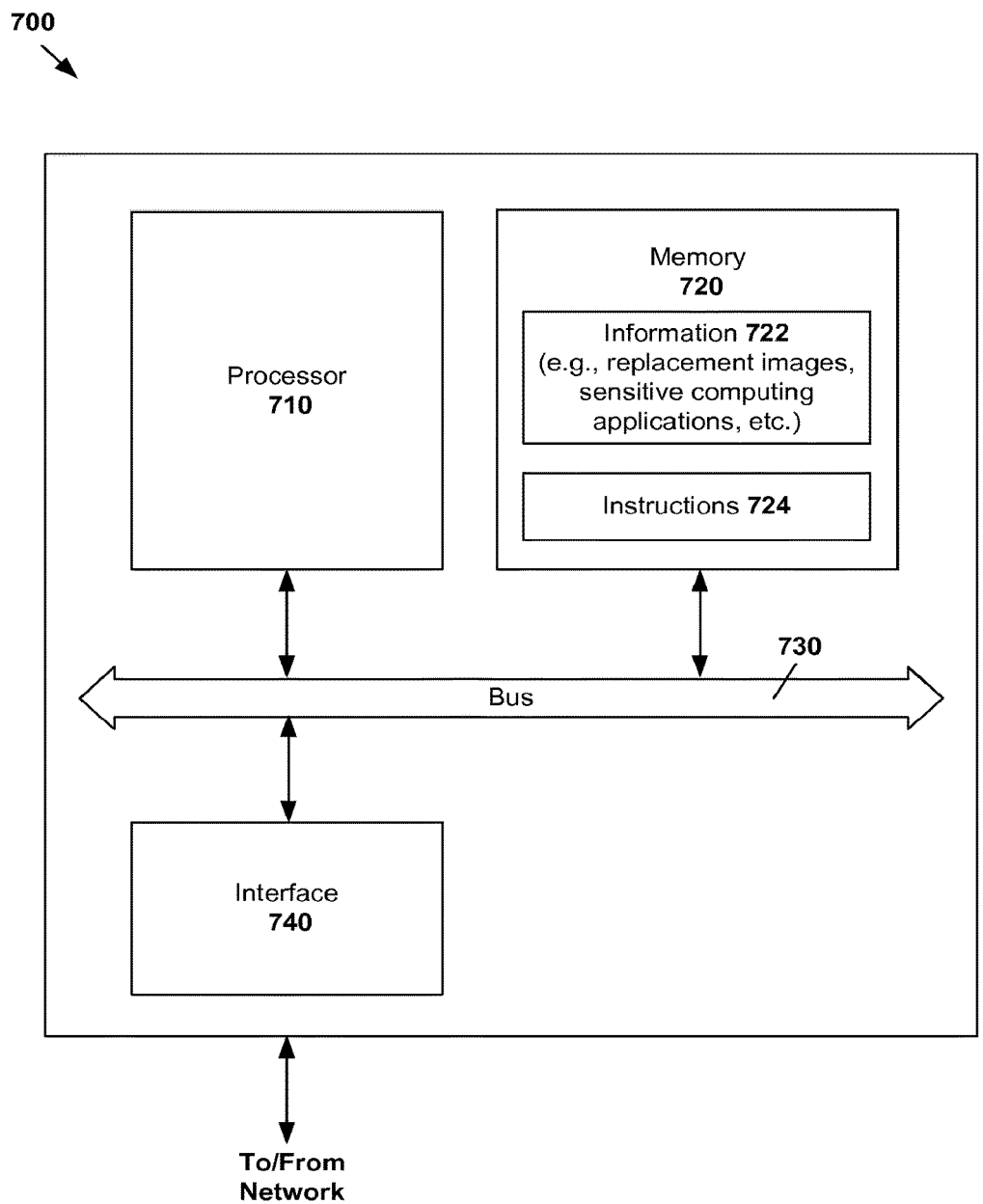
FIG. 7 is a schematic diagram illustrating an example computing device to conceal sensitive information on a second display.

FIG. 7 is a schematic diagram of an example device 700 capable of acting as computing device 110 as a standalone device or client device in virtualized computing environment 600. Example device 700 may include processor 710, memory 720, network interface or port 740, and bus 730 that facilitates communication among these illustrated components and other components.

Processor 710 is to perform processes described herein with reference to FIG. 1 to FIG. 6. Memory 720 may store relevant information 722 to conceal sensitive information, such as mirror and replacement images, list of sensitive computing applications, etc. Memory 720 may further store machine-readable instructions 724 executable by processor 710 to cause processor 710 to perform processes described herein with reference to FIG. 1 to FIG. 6.

The methods, processes and components described herein may be implemented by hardware (e.g., special-purpose hardwired circuitry), software or firmware or a combination thereof. Special-purpose hardwired circuitry may be in the form of, for example, one or more application-specific integrated circuits (ASICs), programmable logic devices (PLDs), field-programmable gate arrays (FPGAs), and others. Software and/or firmware to implement the techniques introduced here may be stored on a non-transitory machine-readable storage medium and may be executed by one or more general- or special-purpose programmable microprocessors.

The term 'processor' is to be interpreted broadly to include one or more processing units, ASICs, logic units, or programmable gate arrays, etc. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non recordable media (e.g., read-only memory (ROM), random access memory (RAM), magnetic disk storage media, optical storage media, flash memory devices, etc.)

The figures are only illustrations of an example, wherein the units, components or processes shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method to conceal sensitive information on a display, wherein a computing device is coupled to a first display and a second display, comprising:
   detecting sensitive information shown on a first display by detecting a user interface element associated with sensitive information, the user interface element comprising an input field;
   detecting a virtual keyboard shown on the first display, the virtual keyboard being separate from the input field associated with the sensitive information;
   in response to detecting sensitive information in shown on the first display, generating replacement imagery that conceals the virtual keyboard in the first display and sending the replacement imagery to the second display at a position corresponding to the virtual keyboard on the first display, wherein the replacement imagery comprises an indication that the replacement imagery is concealing the virtual keyboard in the second display; and
   in response to a failure to detect sensitive information in the first display, sending a duplicate of the first display to the second display.

2. The method of claim 1, wherein the replacement imagery further comprises one of a video, a screensaver, or a blank image.

3. The method of claim 1, wherein detecting the sensitive information shown on the first display further comprises detecting a username entry field or a password entry field.

4. The method of claim 1, wherein detecting the sensitive information shown on the first display further comprises detecting an instance of a particular application executing on the computing device.

5. The method of claim 4, wherein detecting the sensitive information further comprises detecting whether the particular application is visible on a desktop associated with the first display.

6. The method of claim 1, further comprising subsequent to sending the replacement imagery to the second display at a position corresponding to the sensitive information on the first display, sending a duplicate of the first display to the second display upon detecting that the sensitive information no longer appears on the first display.

7. A non-transitory computer-readable storage medium containing instructions which, when executed by a processor of a computing device coupled to a first display and a second display, causes the processor to at least:
   detect sensitive information shown on the first display by detecting a user interface element associated with sensitive information, the user interface element comprising an input field;
   detect a virtual keyboard shown on the first display, the virtual keyboard being separate from the input field associated with the sensitive information;
   in response to detection of sensitive information shown on the first display, generate replacement imagery that conceals the virtual keyboard detected in the first display and send the replacement imagery to the second display at a position corresponding to the virtual keyboard on the first display, wherein the replacement imagery comprises an indication that the replacement imagery is concealing the virtual keyboard in the second display; and in response to a failure to detect sensitive information in the first display, send a duplicate of the first display to the second display.

8. The non-transitory computer-readable storage medium of claim 7, wherein the replacement imagery further comprises one of a video, a screensaver, or a blank image.

9. The non-transitory computer-readable storage medium of claim 7, wherein the sensitive information shown on the first display is further detected by detecting a username entry field or a password entry field.

10. The non-transitory computer-readable storage medium of claim 7, wherein the sensitive information shown on the first display is detected by detecting an instance of a particular application executing on the computing device.

11. The non-transitory computer-readable storage medium of claim 10, wherein the sensitive information is detected by determining whether the particular application is visible on a desktop associated with the first display.

12. The non-transitory computer-readable storage medium of claim 7, the instructions further causing the computing device to, subsequent to sending the replacement imagery to the second display at a position corresponding to the sensitive information on the first display, send a duplicate of the first display to the second display upon detecting that the sensitive information no longer appears on the first display.

13. A system, comprising:
at least one computing device coupled to a first display and a second display;
an application executed by the at least one computing device, the application configured to cause the at least one computing device to at least:
  detect sensitive information shown on the first display by detecting a user interface element associated with sensitive information, the user interface element comprising an input field;
  detect a virtual keyboard shown on the first display, the virtual keyboard being separate from the input field associated with the sensitive information;
  in response to detection of sensitive information shown on the first display, generate replacement imagery that conceals the virtual keyboard detected in the first display and send the replacement imagery to the second display at a position corresponding to the virtual keyboard on the first display, wherein the replacement imagery comprises an indication that the replacement imagery is concealing the virtual keyboard in the second display; and
  in response to a failure to detect sensitive information in the first display, send a duplicate of the first display to the second display.

14. The system of claim 13, wherein the replacement imagery further comprises one of a video, a screensaver, or a blank image.

15. The system of claim 13, wherein the sensitive information shown on the first display is further detected by detecting a username entry field or a password entry field.

16. The system of claim 13, wherein the sensitive information shown on the first display is detected by detecting an instance of a particular application executing on the at least one computing device and detecting whether the particular application is visible on a desktop associated with the first display.

17. The system of claim 13, the application further causing the at least one computing device to, subsequent to sending the replacement imagery to the second display at a position corresponding to the sensitive information on the first display, send a duplicate of the first display to the second display upon detecting that the sensitive information no longer appears on the first display.

18. The method of claim 5, wherein detecting whether the particular application is visible comprises determining whether an operating system application programming interface (API) function returns a value corresponding to a visibility state of the particular application that indicates that the particular application is visible on the first display.

19. The non-transitory computer-readable storage medium of claim 11, wherein the instructions detect whether the particular application is visible by determining whether an operating system application programming interface (API) function returns a value corresponding to a visibility state of the particular application that indicates that the particular application is visible on the first display.

20. The system of claim 16, wherein the application detects whether the particular application is visible by determining whether an operating system application programming interface (API) function returns a value corresponding to a visibility state of the particular application that indicates that the particular application is visible on the first display.

* * * * *